United States Patent
Sun et al.

(10) Patent No.: US 11,386,174 B2
(45) Date of Patent: Jul. 12, 2022

(54) USER ELECTRONIC MESSAGE SYSTEM

(71) Applicant: Airbnb, Inc., San Francisco, CA (US)

(72) Inventors: Zhentao Sun, Mountain View, CA (US); Dawei Wang, Seattle, WA (US); Sean Odonnell, San Francisco, CA (US); Noah Martin, San Francisco, CA (US); Andriy Sergiyenko, San Jose, CA (US); Greg Thompson, San Francisco, CA (US); Shike Mei, San Carlos, CA (US)

(73) Assignee: Airbnb, Inc., San Francisco, CA (US)

( * ) Notice: Subject to any disclaimer, the term of this patent is extended or adjusted under 35 U.S.C. 154(b) by 544 days.

(21) Appl. No.: 16/503,163

(22) Filed: Jul. 3, 2019

(65) Prior Publication Data
US 2021/0004422 A1 Jan. 7, 2021

(51) Int. Cl.
*G06F 16/90* (2019.01)
*G06F 16/9535* (2019.01)
*H04L 51/00* (2022.01)
*G06F 16/9538* (2019.01)
*G06N 20/00* (2019.01)

(52) U.S. Cl.
CPC ...... *G06F 16/9535* (2019.01); *G06F 16/9538* (2019.01); *G06N 20/00* (2019.01); *H04L 51/12* (2013.01)

(58) Field of Classification Search
None
See application file for complete search history.

(56) References Cited

U.S. PATENT DOCUMENTS

| | | | | |
|---|---|---|---|---|
| 2006/0229948 A1* | 10/2006 | Kavanagh | .......... | G06Q 30/0255 705/14.25 |
| 2007/0260692 A1* | 11/2007 | Burgoyne | ............ | G06Q 10/107 709/206 |
| 2008/0015878 A1* | 1/2008 | Feng | ...................... | G06Q 30/02 705/1.1 |
| 2013/0054376 A1* | 2/2013 | Ross | ....................... | G06Q 40/08 705/14.66 |
| 2017/0169098 A1* | 6/2017 | Frankel | ................... | G06F 16/24 |

* cited by examiner

*Primary Examiner* — Belix M Ortiz Ditren
(74) *Attorney, Agent, or Firm* — Schwegman Lundberg & Woessner, P.A.

(57) ABSTRACT

Network site users can be selected to receive a communication based on a network site event, such as incomplete registration. A hybrid user interaction machine learning scheme can select a portion of the selected users based on user interaction estimates and network sampling data. The electronic document sent to the users can have portions that undergo two-pass ranking for ordering of content items to be included in the electronic document, such as an email.

20 Claims, 15 Drawing Sheets

USER ELECTRONIC MESSAGE SYSTEM

TECHNICAL FIELD

Embodiments of the present disclosure relate generally to Internet messages and, more particularly, but not by way of limitation, to managing electronic content of a network site.

BACKGROUND

Users of a network site can receive electronic communications from the site, such as content updates and site information. For example, a user may provide an email to the network site to receive emails from the site, but may have not completed a registration process with the site. The network site may determine that a plurality of its users have submitted their emails but not completed network site registration. The network site may transmit emails to the users to prompt them to complete network site registration. Some users may receive too many emails from different network sites and may ignore network site communications, while other users may welcome such network site communications. It is currently difficult for network sites to determine which of its users should receive electronic communications without sending out large barrages of electronic communications.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
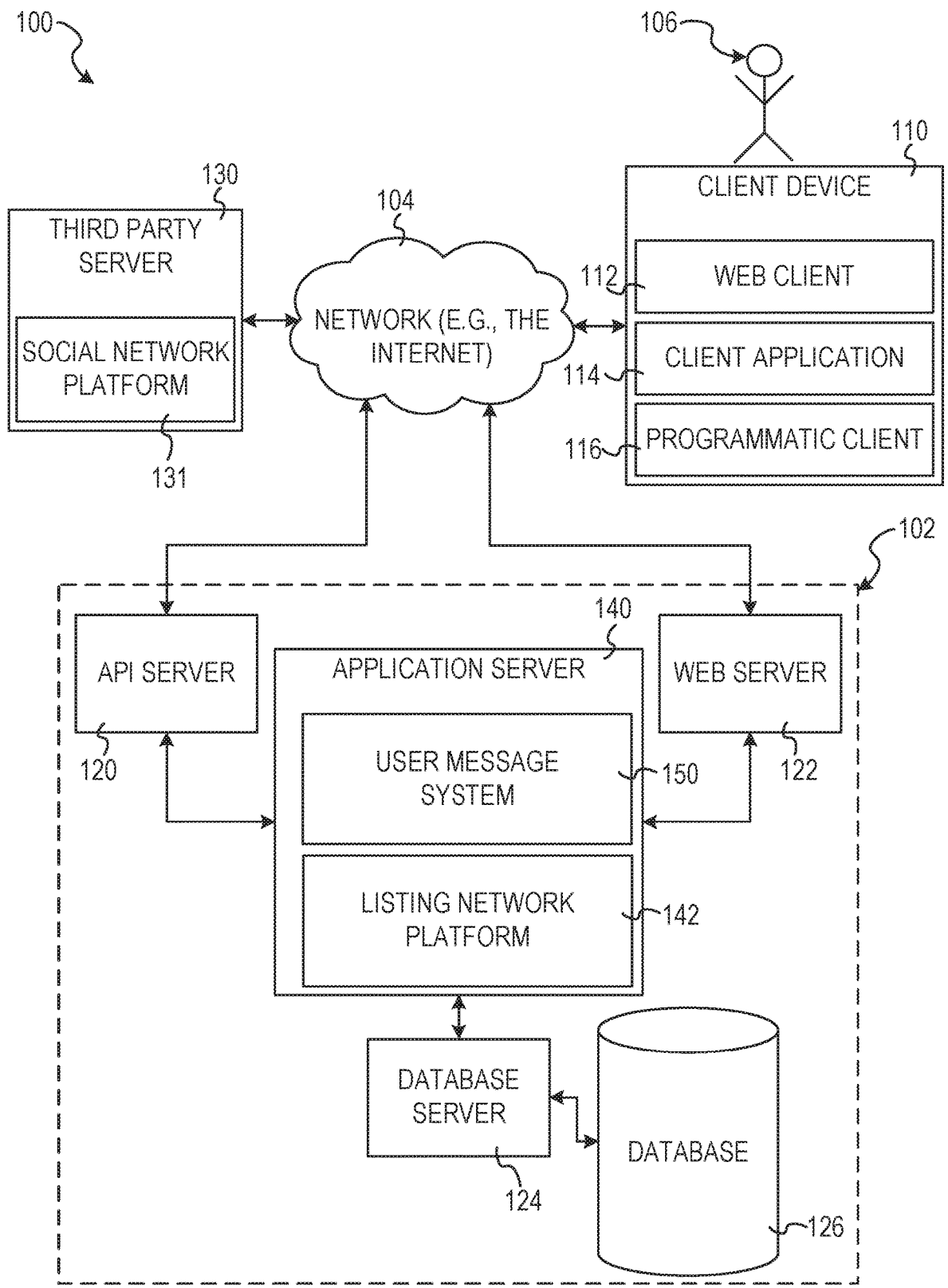
FIG. 1 is a block diagram illustrating a user message system implemented in a networked environment, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

As mentioned, it is difficult for a network platform (e.g., network site, website, mobile application) to identify which of its users should receive electronic communications. As an illustrative example, some network sites users may interact with a network site (e.g., click, browse, input email data), then cease to interact with the network site for an extended period of time. For instance, users may have provided their email addresses to a news website to receive updates, but not completed the news website's account profile setup process. The news website may send the users an email to prompt them to complete the setup process. However, of the users who provided their emails to the news site, some may welcome the email that reminds them to complete the sign-up process (e.g., users who intended to complete the sign-up process later or accidently closed the browser or app during the set-up process), while other users may not welcome such emails and unsubscribe from the network site if follow-up emails are sent. Ideally, the network site seeks to send emails only to those that welcome such communications. Determining which users would welcome such communications is very difficult. One conventional approach is sending a barrage of emails to all users; however, as discussed, that can have negative effects for the network site (e.g., reduced user logons, interactions, or sign-ups).

Another conventional approach involves creating rules or heuristics for when users or items of a certain type should be sent a certain type of email in response to certain events. Examples of such granular heuristics include: send an email to users who add items to a shopping cart but then log off and do not complete the transaction, send an email to users every three days, send users who have indicated they have kids an email about spring kids clothing sale in the third quarter, and so on. However, the granular heuristics approach requires a large amount of resources to create each of the rules and maintain all of the rules in response to changing network events. For example, if the network site that sells clothes no longer sells kids clothes, then all of the heuristic rules must be analyzed to make sure the network site does not trigger irrelevant communications. As the number of electronic documents that could be sent increases, the number of items on a network site increases, and the number of site users increases, the granular heuristics approach becomes impractical for many network sites.

To this end, example embodiments provide a user message system implemented to identify which users should receive an electronic document (e.g., an email) and to select and arrange content from the site to include in the electronic document for each selected user. In the below examples, a registration abandonment follow-up email is discussed as example implementation of the user message system. It is appreciated that the user message system can be implemented for different types of electronic documents for different network site events.

In example embodiments, the user message system selects users to receive the electronic communication by generating a machine learning model (e.g., a decision tree) of users who are likely to interact with the electronic communication (e.g., open the email), and then use the machine learning model trained to determine electronic document interaction likelihoods to identify users who are likely to complete the registration process on the network site. In other words, the system uses a machine learning model configured to generate probabilities for a first network site interaction type (e.g., email open rate) to accurately generate probabilities that the users will perform a second different network site interaction type for which the machine learning model is not trained.

In some example embodiments, the user message system correlates the two interaction types using a stratified data structure that separates the first network site interaction type values into segments, then live network tests each segment to tag one or more segments that contain users who are likely to perform the second network site interaction type. In this way, the user message system can implement a hybrid machine learning model that can accurately identify users who are likely to perform a pre-specified user interaction based on a different user interaction. For example, it can be difficult or impossible to generate a machine learning model to identify users who will complete the registration directly based on being sent an email about registration. This may be due in part between a lack of signal between the email event and the registration event. For example, some of the emailed users may plan on signing up in response to the email, while other users may sign up regardless of emails sent (e.g., a user that signs up from general interest in the site), and so on. Thus, building a direct model based on ambiguous user actions may not be possible. As an additional example, assume a user added an item to his shopping cart on a shopping website but did not complete the checkout process. In that example, it can be difficult to determine whether a follow-up email about items left in the shopping cart would yield a resulting check out completion process. One user may have intended to complete the check out process anyways and may view follow up emails as an annoyance, whereas another user may welcome such a follow up email. In such cases, direct modeling of which user will act a certain way is difficult. Thus, one advantage of the user message system hybrid model is that it can generate a likelihood that users will perform a hard to predict network action (e.g., registration, checkout) based on a more concrete event that can be modeled (e.g., email open rate, article bookmarked count, social network likes, and so on).

The user message system is further configured to create a follow-up electronic document that complements the user selection process by customizing the content sent for the selected users. As a high-level example of electronic document generation, the user message system identifies a plurality of content schemes that can be included in an electronic document (e.g., email). Each content scheme is configured to insert network site items in a user interface (UI) window based on a preconfigured search or retrieval scheme. For instance, assume the network site is a listings website that allows posting users to post property listings to the site (e.g., vacation rentals), and other browsing users can browse the listings website to select and purchase one or more of the listed properties. In this example embodiment, a first content scheme can be a "premium listings" content scheme that retrieves four premium listings posted on the site and inserts them in a top portion of an email. A second content scheme can be a "new listings" content scheme that retrieves recently posted listings and inserts them in a bottom portion of the email layout. In some example embodiments, which listings are included as items in a given content scheme is based on the individual user's profile data (e.g., profile data, location, age, search history). The user message system is configured to determine which of the available content schemes are to be included in an electronic document and in what order, based on a given user's data. In some example embodiments, the user message system selects content schemes based on a small set of content scheme level heuristics that are based on simple rules for content schemes, not the underlying listings or items, as heuristics at the item or user level are difficult to maintain, as discussed above. From the selected content schemes, the user message system ranks the content schemes for a given user using a ranking scheme, populates the content scheme window's listings data from the network site, filters the populated windows based on content scheme dependency conflicts, and further performs filtering based on a given user's stored data. The user message system then transmits the electronic document to each of the users who were selected using the dual interaction machine learning interaction model discussed above. In this way, a network site can implement the user message system to correctly identify users to receive an electronic document and arrange the electronic document content to increase the likelihood that the recipient users will perform a given network site action (e.g., completion of a registration process).

With reference to FIG. 1, an example embodiment of a high-level client-server-based network architecture 100 is shown. A networked system 102, in the example forms of a network-based marketplace or payment system, provides server-side functionality via a network 104 (e.g., the Internet or wide area network (WAN)) to one or more client devices 110. In some implementations, a user (e.g., user 106) interacts with the networked system 102 using the client device 110. FIG. 1 illustrates, for example, a web client 112 (e.g., a browser), applications 114, and a programmatic client 116 executing on the client device 110. The client device 110 includes the web client 112, the client application(s) 114, and the programmatic client 116 alone, together, or in any suitable combination. Although FIG. 1 shows one client device 110, in other implementations, the network architecture 100 comprises multiple client devices.

In various implementations, the client device 110 comprises a computing device that includes at least a display and communication capabilities that provide access to the networked system 102 via the network 104. The client device 110 comprises, but is not limited to, a remote device, work station, computer, general purpose computer, Internet appliance, hand-held device, wireless device, portable device, wearable computer, cellular or mobile phone, Personal Digital Assistant (PDA), smart phone, tablet, ultrabook, netbook, laptop, desktop, multi-processor system, microprocessor-based or programmable consumer electronic, game consoles, set-top box (STB), network personal computer (PC), mini-computer, and so forth. In an example embodiment, the client device 110 comprises one or more of a touch screen, accelerometer, gyroscope, biometric sensor, camera, microphone, Global Positioning System (GPS) device, and the like.

The client device 110 communicates with the network 104 via a wired or wireless connection. For example, one or more portions of the network 104 comprises an ad hoc network, an intranet, an extranet, a Virtual Private Network (VPN), a Local Area Network (LAN), a wireless LAN (WLAN), a WAN, a wireless WAN (WWAN), a Metropolitan Area Network (MAN), a portion of the Internet, a portion of the Public Switched Telephone Network (PSTN), a cellular telephone network, a wireless network, a Wireless Fidelity (WI-FI®) network, a Worldwide Interoperability for Microwave Access (WiMax) network, another type of network, or any suitable combination thereof.

In some example embodiments, the client device 110 includes one or more of the applications (also referred to as "apps") such as, but not limited to, web browsers, book reader apps (operable to read e-books), media apps (operable to present various media forms including audio and video), fitness apps, biometric monitoring apps, messaging apps, electronic mail (email) apps, and e-commerce site apps (also referred to as "marketplace apps"). In some implementations, the client application(s) 114 include various components operable to present information to the user and communicate with networked system 102. In some embodiments, if the e-commerce site application is included in the client device 110, then this application is configured to locally provide the user interface and at least some of the functionalities with the application configured to communicate with the networked system 102, on an as needed basis, for data or processing capabilities not locally available (e.g., access to a database of items available for sale, to authenticate a user, to verify a method of payment). Conversely, if the e-commerce site application is not included in the client device 110, the client device 110 can use its web browser to access the e-commerce site (or a variant thereof) hosted on the networked system 102.

The web client 112 accesses the various systems of the networked system 102 via the web interface supported by a web server 122. Similarly, the programmatic client 116 and client application(s) 114 accesses the various services and functions provided by the networked system 102 via the programmatic interface provided by an Application Program Interface (API) server 120.

Users (e.g., the user 106) comprise a person, a machine, or other means of interacting with the client device 110. In some example embodiments, the user is not part of the network architecture 100, but interacts with the network architecture 100 via the client device 110 or another means. For instance, the user provides input (e.g., touch screen input or alphanumeric input) to the client device 110 and the input is communicated to the networked system 102 via the network 104. In this instance, the networked system 102, in response to receiving the input from the user, communicates information to the client device 110 via the network 104 to be presented to the user. In this way, the user can interact with the networked system 102 using the client device 110.

The API server 120 and the web server 122 are coupled to, and provide programmatic and web interfaces respectively to, one or more application server(s) 140. The application server(s) 140 may host a listing network platform 142 and a user message system 150, each of which comprises one or more modules or applications and each of which can be embodied as hardware, software, firmware, or any combination thereof. The application server(s) 140 are, in turn, shown to be coupled to one or more database server(s) 124 that facilitate access to one or more information storage repositories or database(s) 126. In an example embodiment, the database(s) 126 are storage devices that store information to be posted (e.g., inventory, image data, catalog data) to the listing network platform 142. The database(s) 126 also stores digital good information in accordance with some example embodiments.

Additionally, a social network platform 131 is illustrated as executing on third party server(s) 130. Further, the social network platform can programmatically access the networked system 102 via the programmatic interface provided by the API server 120. The social network platform may comprise a social network website, messaging platform, and one or more APIs. In some example embodiments, the electronic message discussed below is a message sent to a given user on via the social network platform 131 messaging system (e.g., social media chat message, post, ping (a "hello" notification), and so on).

The listing network platform 142 provides a number of publication functions and listing services to the users who access the networked system 102. While the listing network platform 142 is shown in FIG. 1 to form part of the networked system 102, it will be appreciated that, in alternative embodiments, the listing network platform 142 may form part of a web service that is separate and distinct from the networked system 102.

In some implementations, the user message system 150 provides functionality to obtain posts published on the social network platform and use the posts to generate listings on the listing network platform 142. The user message system 150 will be discussed further in connection with FIG. 2 below.

While the client-server-based network architecture 100 shown in FIG. 1 employs a client-server architecture, the present inventive subject matter is, of course, not limited to such an architecture, and can equally well find application in a distributed, or peer-to-peer, architecture system, for example. The various systems of the applications server(s) 140 (e.g., the listing network platform 142 and user message system 150) may also be implemented as standalone software programs, which do not necessarily have networking capabilities.

The listing network platform 142 can be hosted on dedicated or shared server machines that are communicatively coupled to enable communications between server machines. The components themselves are communicatively coupled (e.g., via appropriate interfaces) to each other and to various data sources, so as to allow information to be passed between the applications or so as to allow the applications to share and access common data. Furthermore, the components access one or more database(s) 126 via the database server(s) 124. The listing network platform 142 provides a number of publishing and listing mechanisms whereby a seller (also referred to as a "first user") may list (or publish information concerning) goods or services for sale or barter, a buyer (also referred to as a "second user") can express interest in or indicate a desire to purchase or barter such goods or services, and a transaction (such as a trade) may be completed pertaining to the goods or services.

Figure 2:
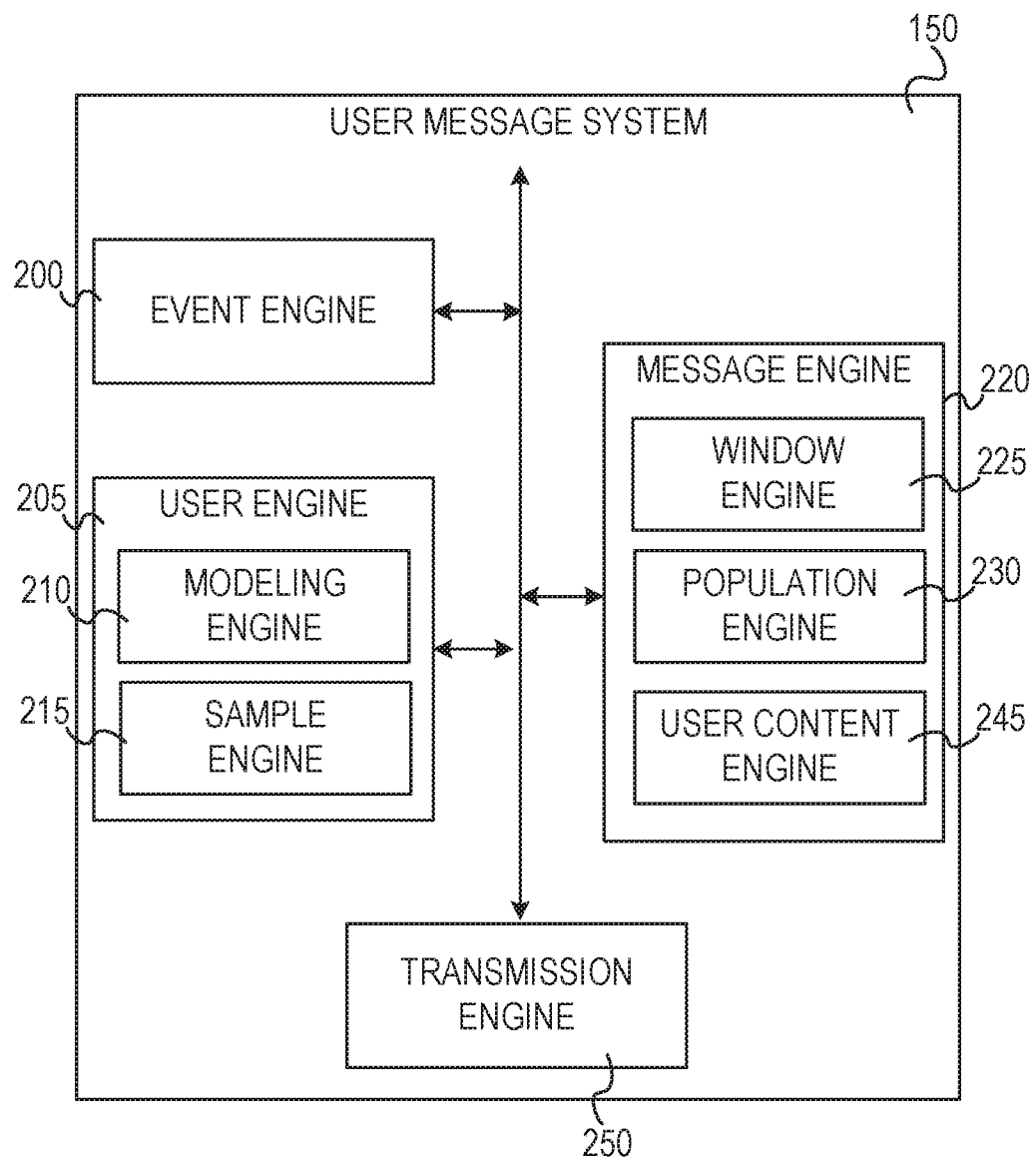
FIG. 2 shows example functional engines of a user message system, according to some example embodiments.

FIG. 2 shows example functional engines of a user message system 150, according to some example embodiments. As illustrated, the user message system 150 comprises an event engine 200, a user engine 205, a message engine 220, and a transmission engine 250. At a high level, the event engine 200 manages identifying users as candidates to receive an electronic message in response to user events on a website; the user engine 205 is configured to select a portion of the users identified by the event engine using a stratified machine learning approach; the message engine 220 is configured to generate electronic communications for transmission to users; and the transmission engine 250 manages transmitting the electronic communications to the users.

In the example embodiment of FIG. 2, the user engine 205 comprises two nested sub-engines, including a modeling engine 210 and a sample engine 215. The modeling engine 210 is configured to generate a machine learning scheme model (e.g., decision tree, random forest, deep neural network) that generates a likelihood that users will interact with the electronic message. The sampling engine 215 manages sampling live network site users to generate results data that translates the output of the machine learning model from a first type of prediction (e.g., an email open rate estimate) to a second type of prediction (e.g., a network site registration estimate).

The message engine 220 likewise comprises sub-engines, including a window engine 225, a population engine 230, and a user content engine 245, according to some example embodiments. The window engine 225 manages selection, ranking, and filtering of content scheme windows. The window engine 225 can perform ranking of content schemes using a first decision tree classifier trained for unpopulated content schemes, according to some example embodiments. The population engine 230 is configured to populate each of the content scheme windows with content data from a network site (e.g., listings data). The user content engine 245 manages determining relevance of populated content to one or more users. The user content engine 245 can perform ranking of populated content schemes using a second decision tree classifier trained for populated content schemes, according to some example embodiments. Although decision trees are discussed in the example embodiments, it is appreciated that other types of machine learning schemes can be implemented, such as a fully-connected deep neural network (DNN) that outputs to a classification layer (e.g., SoftMax layer) to generate rankings.

Figure 3:
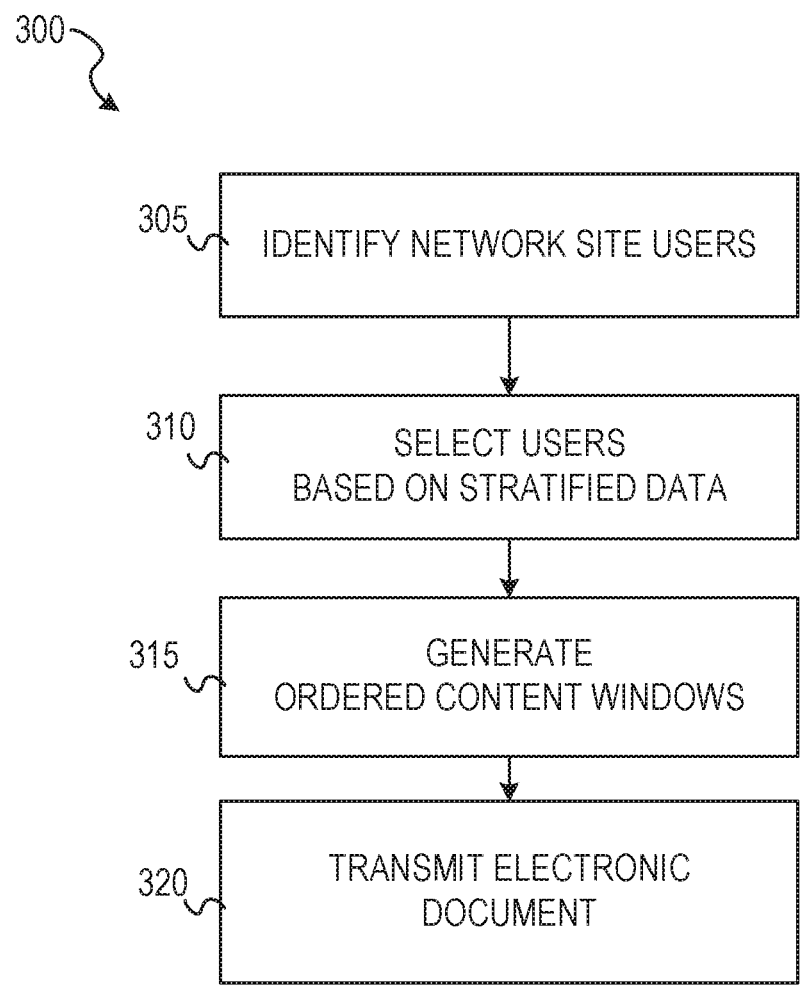
FIG. 3 shows a flow diagram of an example method for transmitting electronic documents using the user message system, according to some example embodiments.

FIG. 3 shows a flow diagram of an example method 300 for transmitting electronic documents using the user message system 150, according to some example embodiments. At operation 305, the event engine 200 identifies network site users. For example, as users interact with a network site, the event engine 200 stores types of interactions to user data (e.g., stores, with a particular user profile data set, an indication that the particular user has performed a given type of interaction). Example interactions can include external site interactions (e.g., the user followed or subscribed to a profile of the network site on another site, such as social network platform 131), or interactions with the listing network site 142 (e.g., providing an email but not completing registration, adding items to a shopping cart module but not completing checkout process) or temporal based interactions (e.g., users not interacting or visiting the listing network platform 142 for a pre-configured period of time). In these example embodiments, at operation 305, the event engine 200 selects a portion of the users based on the selection criteria. For example, if the selection criteria includes users that have provided their email to the site but not completed site registration, then the event engine 200 queries user data in database 126 for users that match the selection criteria (e.g., those users, based on their respective user profile data, have provided an email but do not have other data to complete registration). As an additional example, the selection criteria can include those users that have abandoned a checkout process (e.g., added items or listings to a cart checkout site module but did not complete the checkout process). In this example, at operation 305, the event engine 200 queries user data in database 126 to identify and store users that match the selection criteria for the specified interaction (e.g., users with items in a cart checkout module of listing network platform 142).

At operation 310, the user engine 205 selects users based on stratified data. For example, the user engine 205 selects users who are likely to complete a registration process based on a machine learning scheme configured to generate email open rate estimates, as discussed in further detail below. At operation 315, the message engine 220 generates ordered content windows. For example, the message engine 220 generates a plurality of panels that can be included in an email layout of an email to be sent to the users. At operation 320, the transmission engine 250 transmits electronic documents to the users. The electronic documents can include the panels as organized by the message engine 220 and the recipient users are those indicated as likely to interact with the network site, as identified by the user engine 205.

Figure 4:
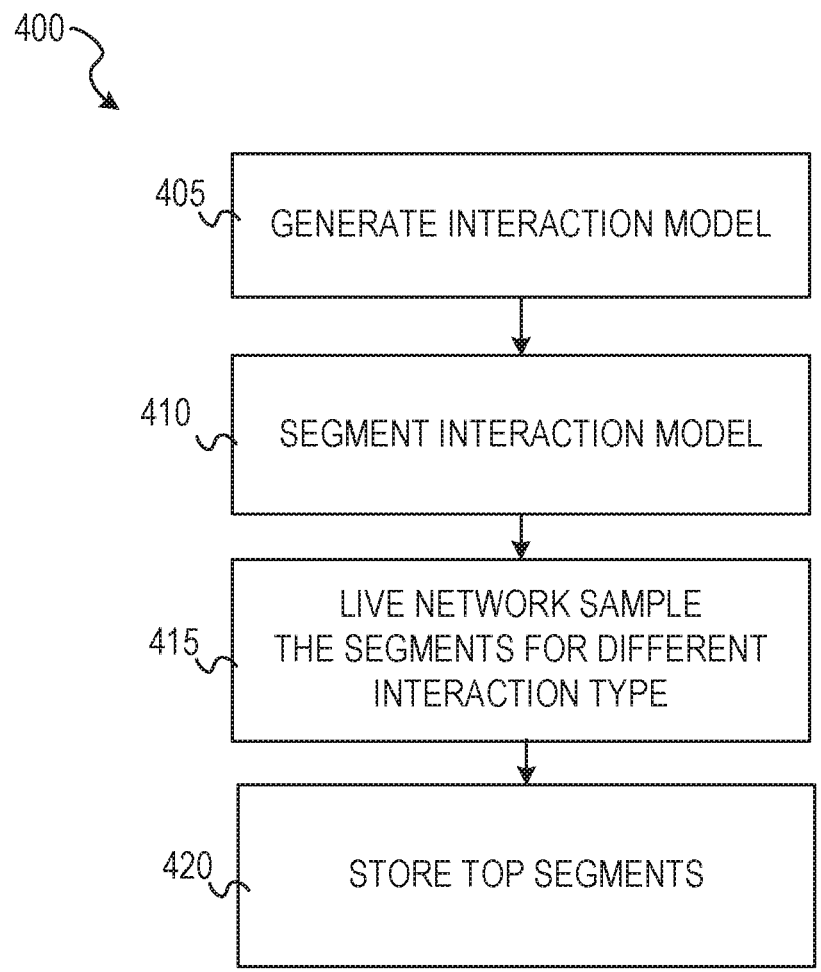
FIG. 4 shows a flow diagram of a method for selecting user segments, according to some example embodiments.
Figure 6:
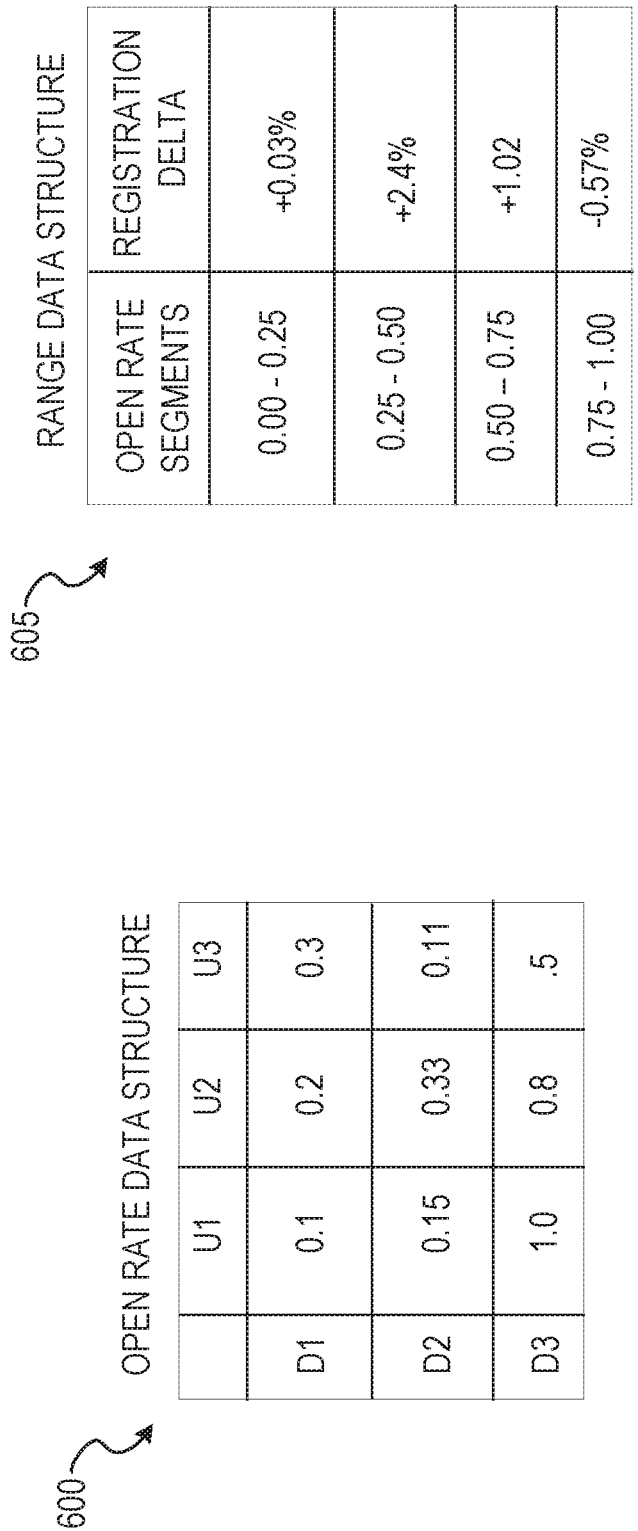
FIG. 6 shows example data structures of the user engine, according to some example embodiments.

FIG. 4 shows a flow diagram of a method 400 for selecting user segments, according to some example embodiments. The method 400 can be implemented as a subroutine of operation 310 in FIG. 3, in which users are selected based on stratified data. At operation 405, the modeling engine 210 generates an interaction model. The interaction model is a machine learning model that generates estimates that users will perform a certain type of network site interaction, such as opening, clicking, or interacting with content sent to the user by the site. In some example embodiments, the machine learning model is a decision tree classifier that is trained to generate a probability that a given user will perform a certain interaction, such as opening an email or interacting with site content. Interaction data structure 600 in FIG. 6 shows example data generated by the machine learning model, according to some example embodiments. In the structure 600, the horizontal axis corresponds to different users, U1, U2, and U3, and the vertical axis corresponds to different days, D1, D2, and D3. In the example structure 600, the likelihood of interaction is from 0 to 1.0 (0 to 100%). For example, in the first day row (D1 row), the first user is 10 percent (0.1) likely to interact, the second user is 20 percent (0.2) likely to interact, and the third user is 30 percent (0.3) likely to interact.

In some example embodiments, the decision tree classifier is trained on past electronic document data and user data. The past electronic document data can be attribute values describing electronic document data, user data, or interactions between a given user and one or more electronic documents. Example training data can include: total number of communications (e.g., emails, posts, ads) sent to the user, type of communication (e.g., marketing campaign email, website update email, daily newsletter emails), open rate of all types of electronic documents for a given user, number of search results shown to the user for a given search, document data (e.g., title, length of description, quantity of images), interactions within a recent time period (e.g., user interaction within last seven days), interactions within the network site in the past time period (e.g., visited site twenty times in the last month), or user data, such as age, account age, demographic data, and so forth. The decision tree can then generate a model that outputs structure 600, according to some example embodiments.

Returning to FIG. 4, at operation 410, the modeling engine 210 segments interaction model data into a plurality of segments. For example, the modeling engine 210 segments the interaction estimates generated by the machine learning model into non-overlapping ranges, such as: 0-25% in a first range, 25% to 50% in a second range, 50% to 75% in a third range, and 75% to 100% in a fourth range as shown in the first column of structure 605 in FIG. 6 (column titled "OPEN RATE SEGMENTS"). In some example embodiments, the ranges are pre-configured into the segments, such as four segments as shown in structure 605, or 10 segments, based on network design optimizations for a given network. In some example embodiments, the segments of ranges are generated by grouping the estimation values of structure 600 into a quantity of groups. For example, a grouping k nearest neighbor scheme may create three segments of 0-45%, 46-56%, and 57-100%, instead of using the pre-configured four segments of 605. The grouping approach can be advantageous when the network administrator integrating the user message system 150 into a given network is unsure how to best segment the ranges.

Returning to FIG. 4, at operation 415, the sample engine 215 samples the segments for a different interaction type. For example, the sample engine selects ten users from the first range (0-25%) in structure 605 and performs live network testing (e.g., A/B testing) on the sampled ten users to determine whether the users perform a second interaction type (registration process) based on the receiving an electronic document. The live network testing can select, from the sampled set of users, a control group that does not receive an email and a test group that does receive an email, from which it can be determined whether the email has a statistical or causal relation to the second hard-to-determine interaction type (e.g., completing registration). As illustrated by the second column in structure 605, the sample engine 215 can perform live network testing for samples from each range to determine a causal relation between the first interaction type of the machine learning model and the second interaction type.

At operation 420, user engine 205 stores top segment ranges based on the live network testing of operation 415. For example, with reference to FIG. 6, the user engine 205 can store only the highest ranging segment 0.25-0.50 and only users in the highest segment will receive an email. As an additional example, the user engine 205 can select the top n segments, where n is a preconfigured integer. For example, if n=2, then the 0.25-0.50 and the 0.50-0.75 segments are selected. Further, the user engine 205 may use a preconfigured threshold. For example, the user engine 205 can select any segment with a value of greater than 0.1 change, in which case the first three segments of structure 605 are selected.

Once the segments are stored, the users in the segments (e.g., the users used to create structure 600) are selected and sent an electronic document by the network site. In some example embodiments, only identification of which segments are highest performing is stored, and new users are selected by inputting their data into the machine learning scheme to generate new values for structure 600, and users who are in the segment ranges are selected as recipients of the electronic document.

Figure 5:
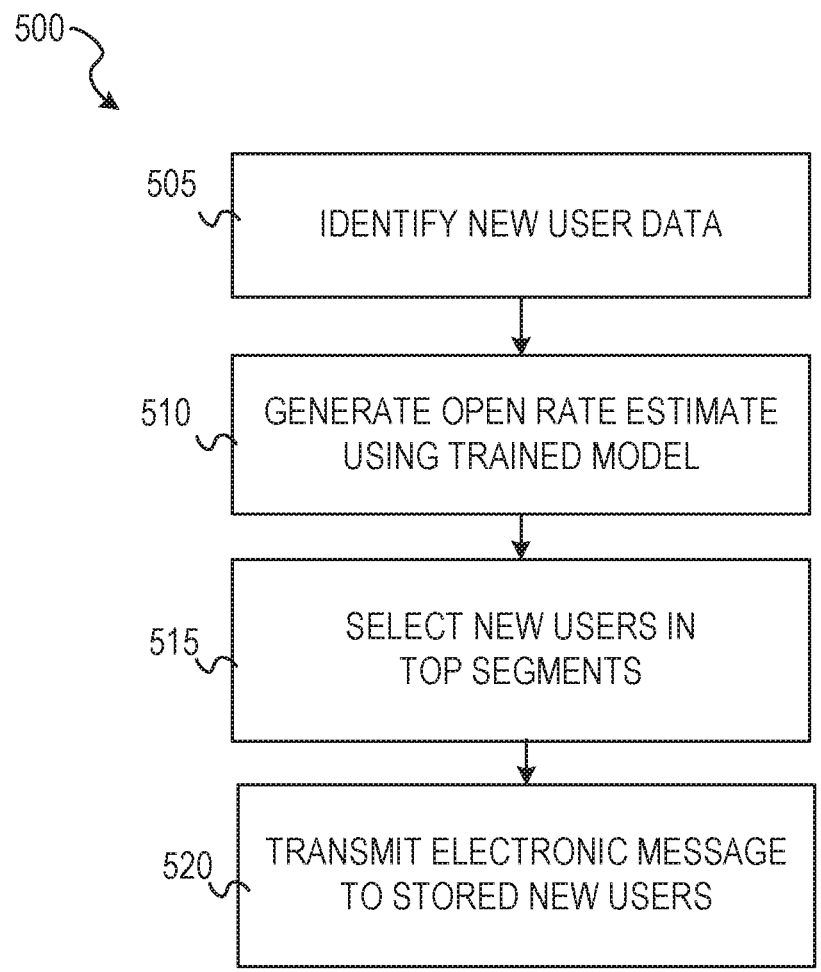
FIG. 5 shows a flow diagram of a method for transmitting an electronic document to users, according to some example embodiments.

FIG. 5 shows a flow diagram of method 500 for transmitting an electronic document to users, according to some example embodiments. In the example of FIG. 5, only identification and selection of the segments is performed by method 400, and users who are actually sent the electronic document are selected if they fall into those segments. For example, for a given network site, method 400 is executed to determine that the middle two segment ranges perform best (i.e., the 0.25-0.50 and the 0.50-0.75 segments). Then, once which segments perform best for a given network site are identified, new users can be input into the machine learning model and selected if they fall into those ranges, without having to again perform live network testing (e.g., A/B sampling).

At operation 505, the event engine 200 identifies new user data, such as users who abandon a browse path on a website (e.g., registration, checkout, and so on). At operation 510, the modeling engine 210 generates interaction estimates (e.g., open rate probabilities) for the new users (e.g., as in structure 600 but with new values generated for the newly identified users). At operation 515, the user engine 205 selects a portion of the new users who are in the top segments of an interaction stratified data structure (e.g., those users who have new values that fall into the middle two segment ranges, as displayed in structure 605). At operation 520, the transmission engine 250 transmits an electronic message to the selected new users based on those users having first interaction types falling in those pre-selected segment ranges. One interesting aspect of the segment range approach of the user message system 150 is that some segments selected by the user message system 150 are logically counter intuitive. For example, while some may assume that the users who open the most emails are likely to perform the follow-up action (e.g., site registration), that may not be the case, as displayed in the 0.75-1.00 row of structure 605 which has a negative live network test result. This system captured artifact of negative change can indicate a set of users who frequent the network site but do not need follow up emails and may actually view follow up communications as unnecessary. In this way, the user message system 150 can capture nuanced segments of users to which to send emails based on hybrid machine learning generated indications.

FIGS. 7-12 are directed to the message engine 220 generating content for the electronic document for each user selected by the user engine 205, according to some example embodiments. As discussed above, a content scheme can select content items (e.g., listings) according to a search or retrieval scheme, such as the top-rated items (e.g., listings with the highest user reviews), newest items, and so on. Each content scheme is an independent search and retrieval model that can be relevant but is not necessarily relevant to the desired user interaction. Thus, determining which content scheme to include in the electronic document, and in what order, can be difficult and live network testing of the myriad of combinations can be impractical. To this end, the message engine 220 is configured to match a set of content schemes to a given user's data, rank the included content, populate the modules with listings content, then reanalyze the included content schemes to ensure the included schemes and ordering thereof are congruent for a given user's signals (e.g., user data).

Figure 7:
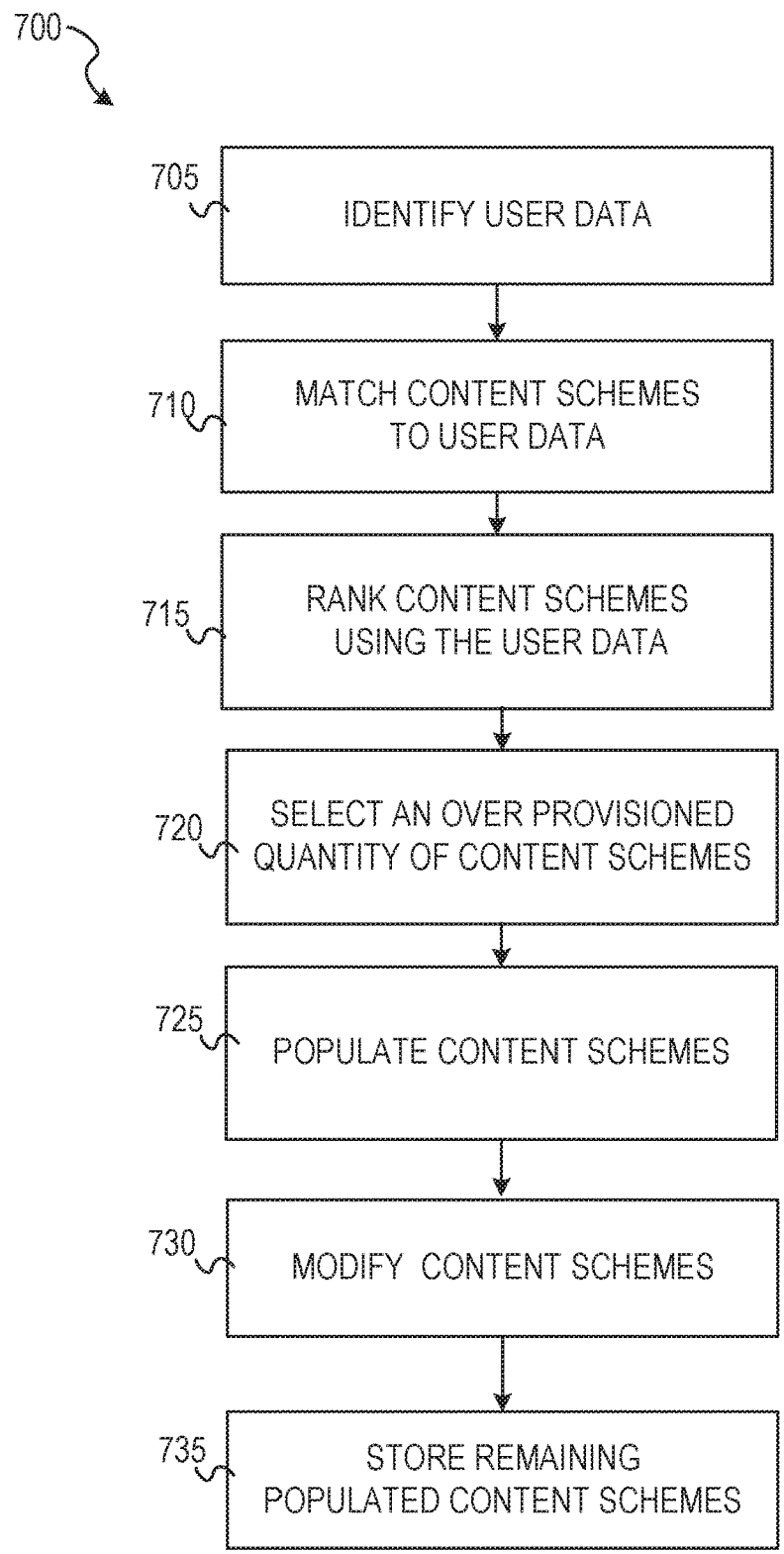
FIG. 7 shows a flow diagram of an example method for processing content schemes, according to some example embodiments.

FIG. 7 shows a flow diagram of an example method 700 for processing content schemes, according to some example embodiments. At operation 705, the message engine 220 identifies user data, such as profile data and historical listing click data that is used to identify content schemes. At operation 710, the window engine 225 matches content schemes to user data to filter out non-matching schemes, as discussed in further detail with reference to FIG. 8 below.

At operation 715, the window engine 225 ranks content schemes using the user data. In some example embodiments, the window engine 225 trains a content scheme ranking decision tree classifier on user datasets of users and available content schemes which are described by attributes such as the type of content scheme (top rank, new listing, etc.), number of listings included, and so on to generate relevancy scores for a given user. The content schemes are then ranked from most relevant to least relevant for that user.

At operation 720, the window engine 225 over provisions a quantity of the ranked content schemes. For example, if the electronic document is to include three content schemes, then at operation 720, the window engine selects six content schemes to ensure enough content schemes are included should any be removed by the further ranking and filtering that follow operation 720, as discussed in further detail with reference to FIG. 9 below.

At operation 725, the population engine 230 populates the selected content schemes. For example, at operation 725, the population engine 230 populates the content scheme with actual listings or items posted to the network site. For instance, before operation 725, the content schemes are processed without containing actual listings, but rather place holders and attributes of what listings will be populated, whereas at operation 725, actual listings that have been submitted to the network site are selected by the content scheme according to the given content schemes' configuration (e.g., top rated listings, new listings, interesting listings, short notice booking, rarely available listings, and so on).

At operation 730, the window engine 225 invalidates one or more populated content schemes to remove invalid populated schemes based on populated content scheme low scores in a two-pass arrangement, as discussed in further detail with reference to FIG. 9.

Figure 8:
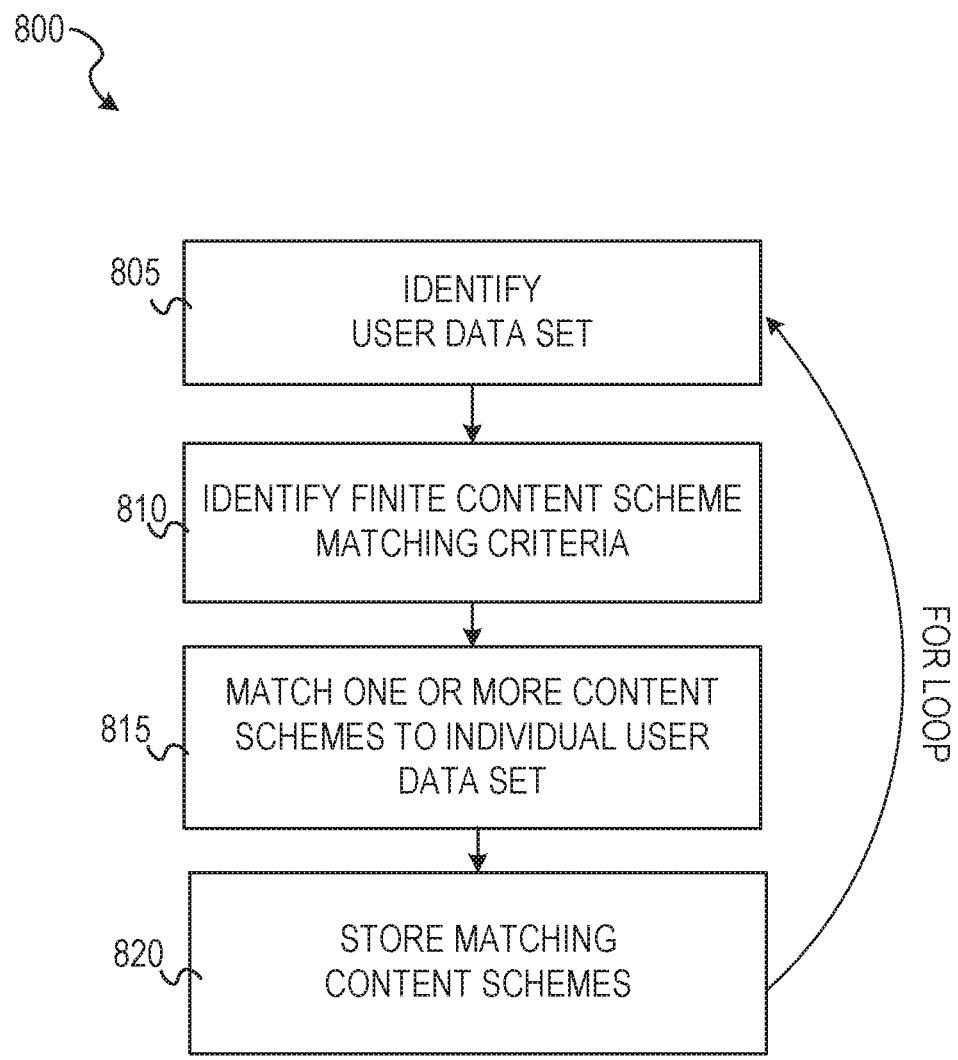
FIG. 8 shows a flow diagram of a method for selecting the set of content schemes for processing, according to some example embodiments.

FIG. 8 shows a flow diagram of a method 800 for selecting the set of content schemes for processing, according to some example embodiments. In some example embodiments, the method 800 is implemented as a sub-routine of operation 710 in FIG. 10 in which a set of content schemes are matched for a given user. At operation 805, the window engine 225 identifies a user data set of a user. At operation 810, the window engine 225 identifies content scheme matching criteria, such as content scheme level heuristics. In some example embodiments, the window engine 225 uses a small set of content scheme level rules to filter the available content scheme set. For example, the matching criteria rules can include: remove nightclub rental listings for users who are looking for a family vacation rental. At the content scheme level, the matching rules or heuristics are easy to maintain and update as the content schemes have broader features. At operation 815, the window engine 225 matches one or more content schemes to the individual user data set. At operation 820, window engine 225 stores the matching content schemes for further processing. As indicated, in some example embodiments, the method 800 is repeated via a loop operation for additional users, thereby creating a reduced content scheme set for each user to be sent the electronic document.

Figure 9:
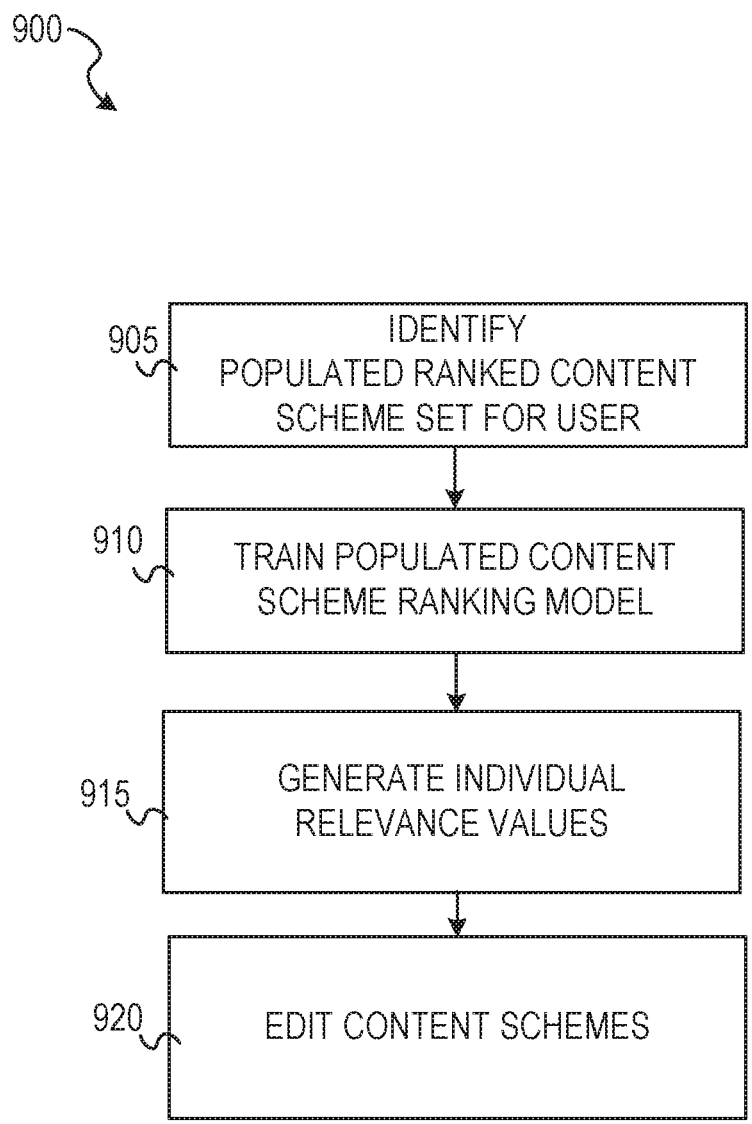
FIG. 9 shows a flow diagram of a method for processing populated content schemes based on user data of the user, according to some example embodiments.

FIG. 9 shows a flow diagram of a method 900 for processing populated content schemes, according to some example embodiments. In some example embodiments, the method 900 is a sub-routine of operation 730 in which content schemes that have been populated with listing data are invalidated or otherwise removed. The method 900 operates as a second pass to ensure the populated content schemes are relevant to each user. In some example embodiments, the output data of operation 710, in which a ranking machine learning model generates ranking values for each content scheme, is used as an input into another machine learning model that classifies content scheme quality based on the listings populated in the content scheme. For example, the ranking machine learning scheme may rank content schemes A, B, C, from most relevant to least relevant (where each letter denotes a different unpopulated content scheme). However, during the ranking, the content schemes are unpopulated and the quality of the content scheme may change depending on what listings are available (posted in database 126) to include in an email at a given time. For example, while A may be ranked highest for a given user, when A is populated with listings, the listings may all be of low-quality (e.g., short description, few pictures, bad user ratings), thereby degrading the relevance of the content scheme to the user. Using the two-pass system of method 900, the message engine 220 can reorganize the content schemes or remove content schemes based on the listings within each of the content schemes affecting the overall quality of the content scheme.

At operation 905, the user content engine 245 identifies a populated ranked content scheme set for a user. For example, with reference to FIG. 11A, assume that operation 710 ranked the premium places content scheme of first window 1110 higher than the new places content scheme of second window 1115; accordingly, first window 1110 is visually located higher in electronic document 1100. Then at operation 725, the content schemes are populated, e.g., the first window 1110 and the second window 1115 are populated with existing listings in database 126. Then, returning back to FIG. 9, at operation 905, the user content engine 245 identifies the populated content schemes (e.g., identifies them as stored data items).

Continuing, at operation 910, user content engine 245 trains a populated content scheme relevance model on user data and listing data of the populated listings. For example, with reference to FIG. 11A, a populated content scheme decision tree classifier receives the listings data for each of the listings (e.g., premium places 1-4, and new places 1-4, metadata such as image quantity and description of each listing, etc.), receives user data for the user (e.g., user data of "John Smith"), and further receives ranking data for the ranked content schemes (e.g., premium places content scheme ranked first, followed by new places as second for the given user as determined at operation 710), and then trains the classifier model to generate a new ranking for each for the content schemes at operation 910.

At operation 915, user content engine 245 generates the new ranking values using the model trained at operation 910. For example, at operation 915, the trained populated content scheme relevance model generates a ranking value that indicates that the new places content scheme of window 1115 is higher quality for a given user than the premium places content scheme of the first window 1110. The higher quality may be due to the listings included in the second window 1115 being of higher quality (e.g., more images, higher reviews) or may be deemed higher quality by the machine learning scheme based on the listings being more relevant to the given user's profile data.

At operation 920, the user content engine 245 edits one or more populated content schemes based on the new rankings. For example, the user content engine 245 moves the new places content in the scheme window 1115 to the top portion of electronic document 1100 and moves the premium places content scheme of the first window 1110 to the bottom portion of electronic document 1100. In this way, even though the premium listings module is ranked highest, the listings in the new places module can override the score of the premium listings module. This may be the case, for example, where the new listings are all of higher quality or have higher reviews than the places that are tagged as premium. In some example embodiments, the user content engine is configured with a threshold value, and if the new ranking value of a given populated content scheme is below the threshold value, then the content scheme is removed. In this example case, the next highest populated scheme is pulled from the over-provisioned populated content set (see operation 720 above). For example, if the new places populated content scheme score of the second window 1115 falls below the threshold, another populated content scheme may be selected for inclusion in the lower portion of the electronic document 1100.

Figure 10:
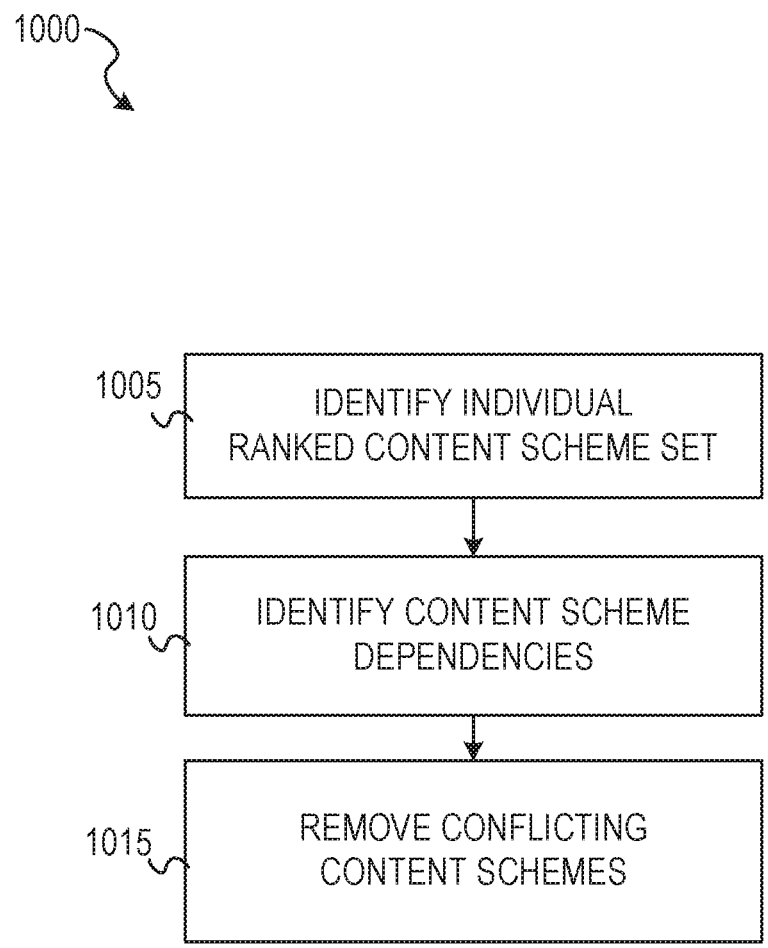
FIG. 10 shows an example flow diagram of a method for processing dependent content schemes, according to some example embodiments.

FIG. 10 shows an example flow diagram of a method 1000 processing a populated content scheme, according to some example embodiments. The method 1000 may be implemented as a subroutine of operation 730 (in which content schemes are modified). In some example embodiments, method 1000 is executed after operation 900 as a clean-up operation to remove invalid content schemes or listings based on pre-configured rules. For example the method 1000 can be executed to remove listings that are repeated in the populated content schemes, remove content schemes that have a dependency conflict, and so on. At operation 1005, window engine 225 identifies the two-pass ranked populated content schemes for an individual user. At operation 1010, the window engine 225 identifies clean-up criteria, including one or more rules such as: remove listings rules (e.g., remove repeating listings, remove listings with no images, and repopulate content scheme), content scheme dependence rules (e.g., remove content scheme "A" if content scheme "B" is present), and so on. At operation 1015, the window engine 225 removes the one or more content schemes and/or edits per the clean-up criteria.

Figure 11A:
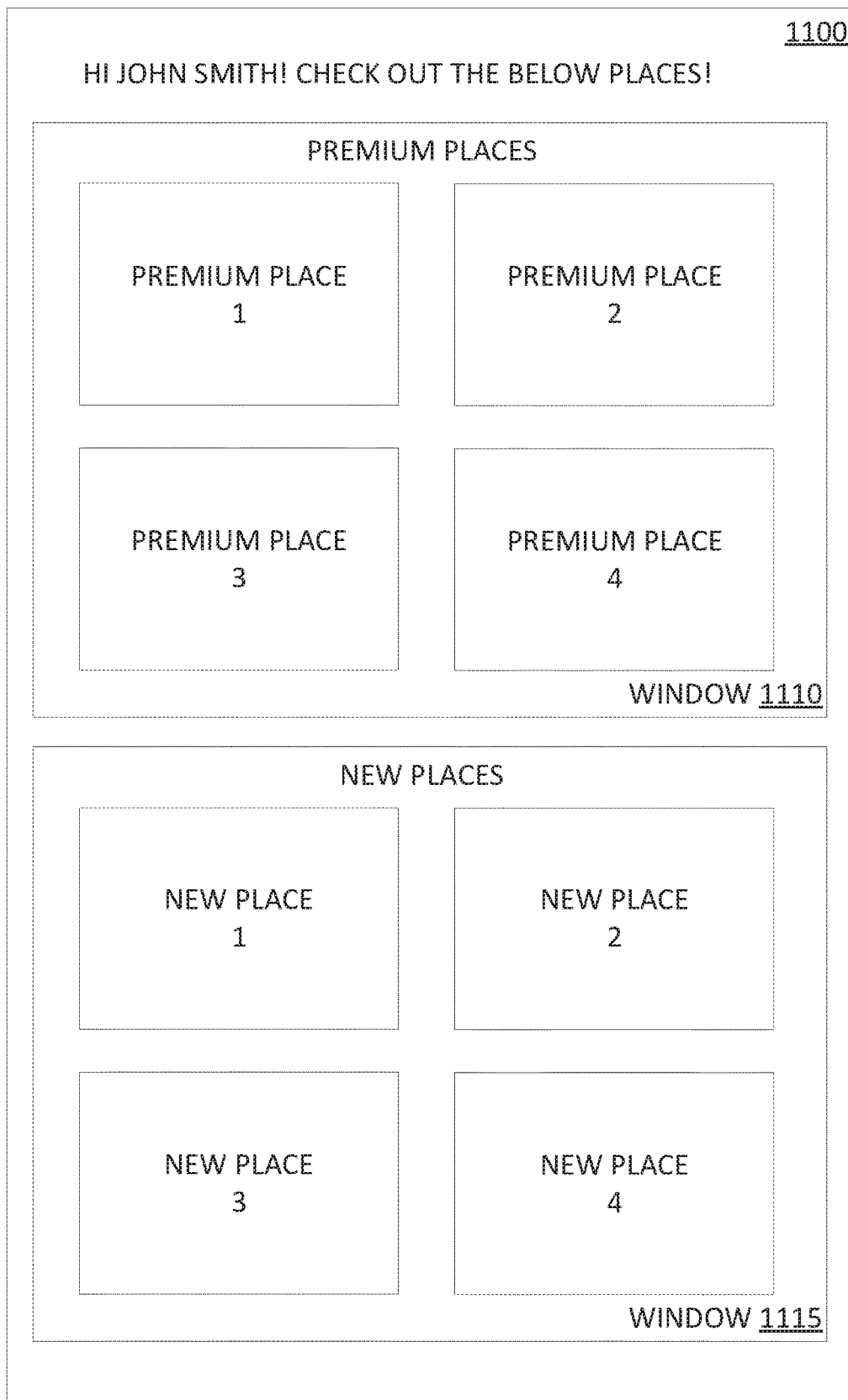
FIG. 11A shows an example electronic document generated by a user message system, according to some example embodiments.

FIG. 11A shows an example electronic document generated by a user message system 150, according to some example embodiments. In the illustrative example, the electronic document 1100 is an email for user (e.g., "John Smith"). The email 1100 comprises a plurality of windows, including the first window 1110 and a second window 1115. Each of the windows may be populated with listings for different content schemes. For example, the first window 1110 is for individual premium listings that match a given user's attribute data, while the window 1115 is for place listings that match a given users attribute data, according to some example embodiments. As discussed above, the user "John Smith" is selected via the stratified machine learning model, and the data items (e.g., listings) and first window 1110 and the second window 1115 are included, populated, and ranked as discussed above.

Figure 11B:
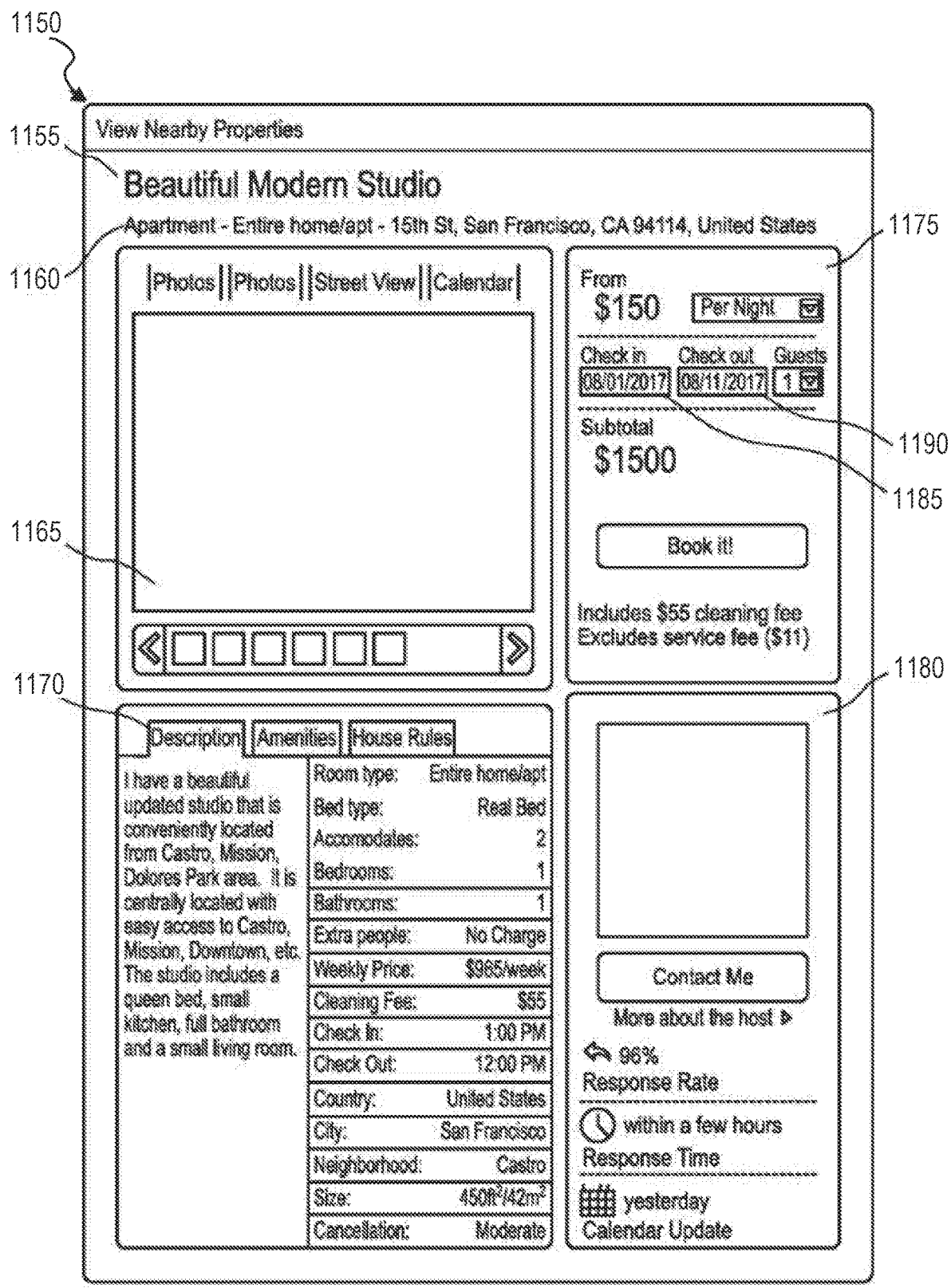
FIG. 11B illustrates an example user interface for a description of a listing for a trip item on a network site, according to some example embodiments.

FIG. 11B illustrates an example user interface 1150 for a description of a listing for a rental item (e.g., an apartment in San Francisco posted to a listings network site by a posting user (e.g., the apartment owner). As illustrated, the example listing shown in FIG. 11B is for accommodations in San Francisco. In other examples, the listing could be for a tour, local experience, transportation, or other trip item. The listing may include a title 1155 and a brief description 1160 of the rental item. The listing may further include photos of the rental item, maps of the area or location associated with the rental item, a street view of the rental item, a calendar of the rental item, and so forth, which may be viewed in area 1165. The listing may include a detailed description 1170, pricing information 1175, and the listing host's information 1180. The listing may further allow a user to select a date range for the rental item by entering or choosing specific check-in date 1185 and check-out date 1190.

Figure 12:
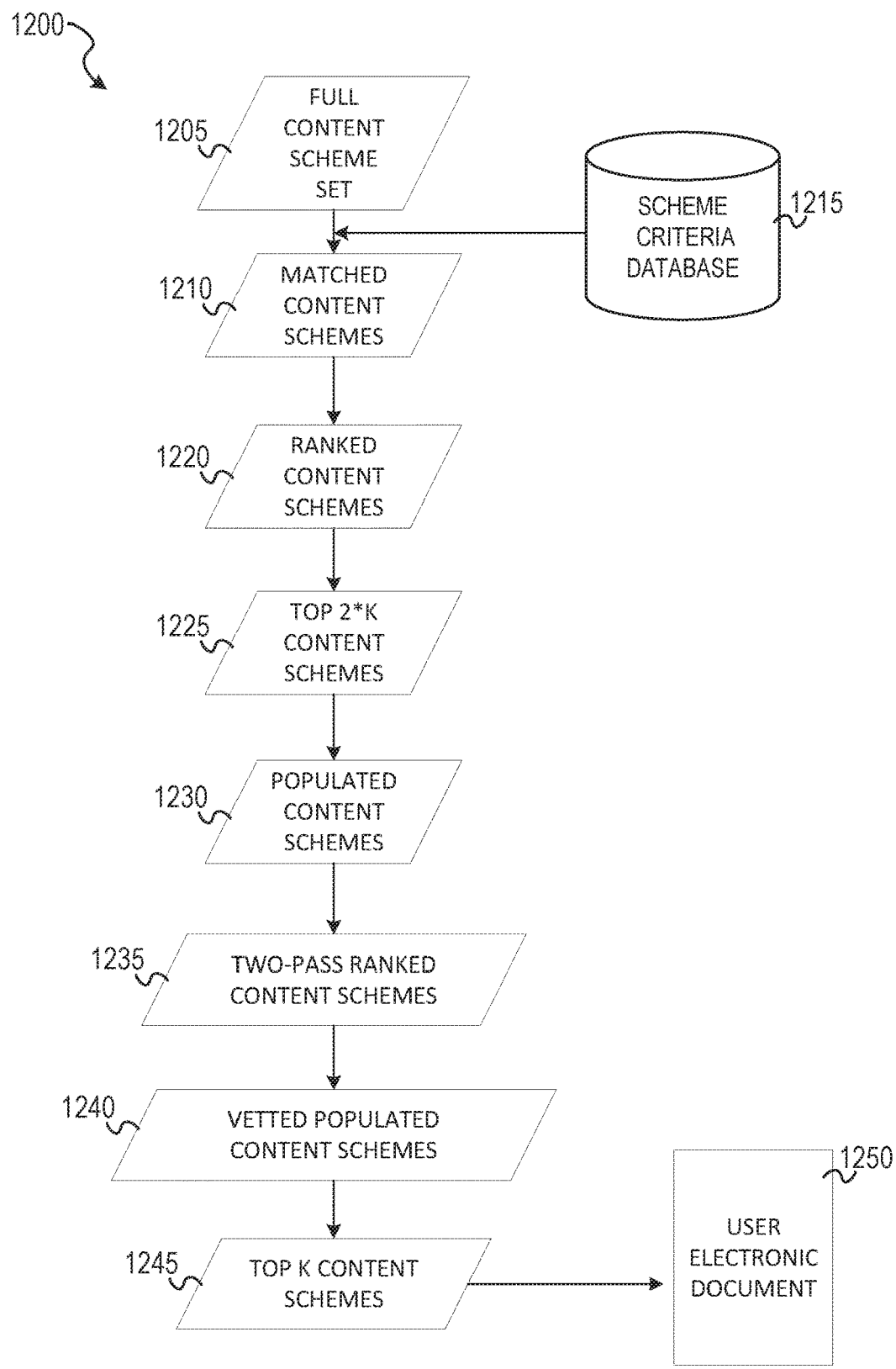
FIG. 12 shows an example dataflow for electronic document content, according to some example embodiments.

FIG. 12 shows an example data structure flow 1200 for electronic document content, according to some example embodiments. The full content scheme set 1205 is a complete set of content scheme in an unpopulated state that can be included in an electronic document. As illustrated, the full content scheme set 1205 of a network site is reduced to matched content schemes using scheme criteria database 1215, which is a small set of manageable heuristics rules specified at the content scheme level. The matched content schemes 1210 are then ranked to generate ranked content schemes 1220 using an unpopulated content scheme decision classifier scheme as discussed with reference to operation 710 above.

From the ranked content schemes 1220, the top 2*K content schemes are selected to produce over provisioned content scheme set 1225, where "K" is the number of content schemes to be included in the electronic document and 2*K is an over-provisioned set of content schemes. Each of the over-provisioned content scheme set 1225 is then populated with postings of user listings to generate populated content schemes data item 1230.

The populated content schemes data item 1230 is reduced to generate the two-pass ranked content schemes 1235 using the populated content scheme relevance model, as discussed above with reference to FIG. 9 above. That is, for example, the ordering of the ranked content schemes 1220 is used as an input feature value in another decision tree to generate the two-pass ranked content schemes 1235.

The two-pass ranked content schemes 1235 are then vetted using clean-up rules to generate the vetted populated content scheme set 1240, as discussed above with reference to FIG. 10. In some example embodiments, one or more of the top content schemes in the vetted populated content schemes are then stored as top k content schemes 1245, which are then added to an electronic document (e.g., email, webpage, app page, etc.) 1250 that is transmitted to the user.

Figure 13:
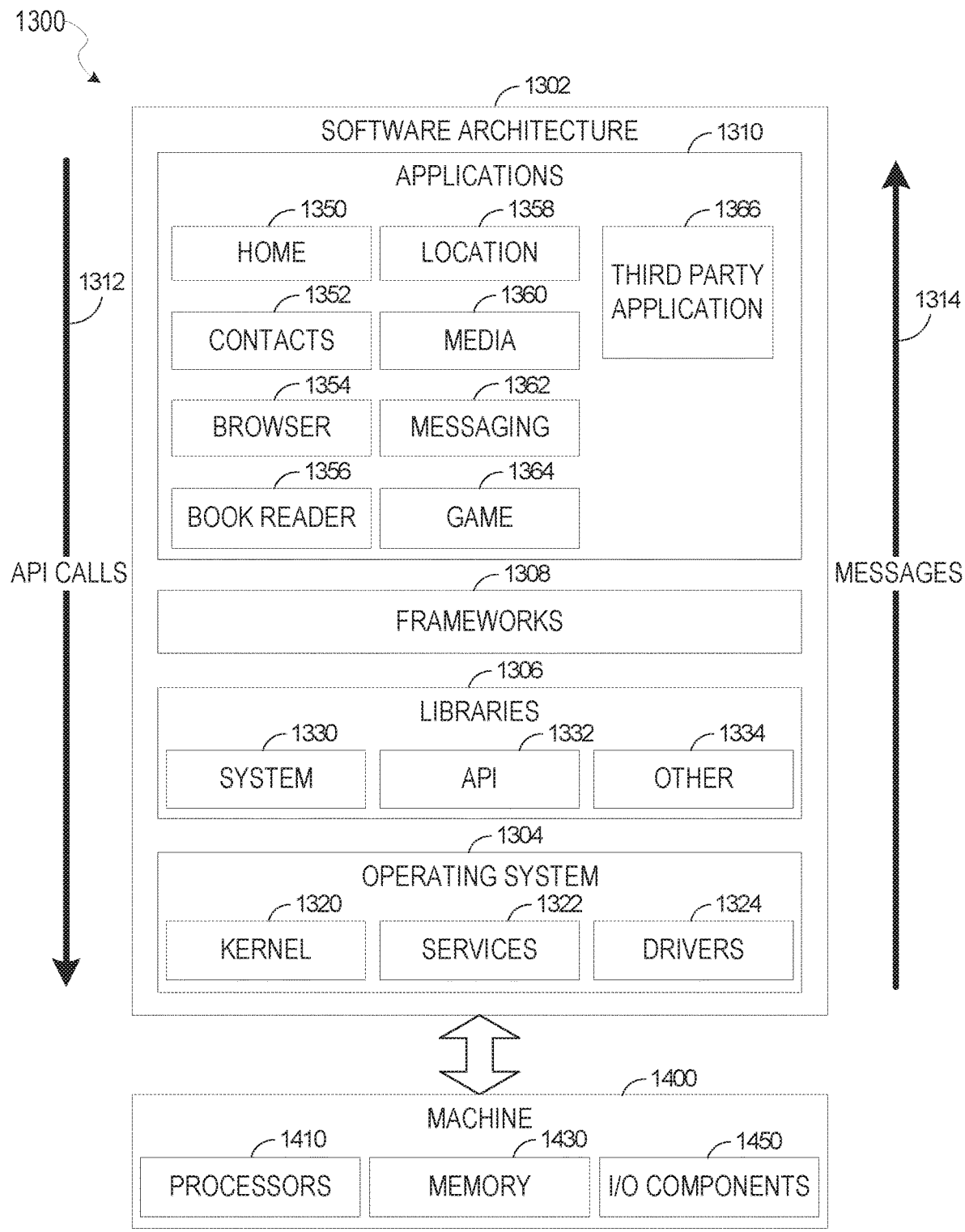
FIG. 13 is a block diagram illustrating architecture of software used to implement the user messaging system, according to some example embodiments.

FIG. 13 is a block diagram 1300 illustrating an architecture of software 1302, which can be installed on any one or more of the devices described above. FIG. 13 is merely a non-limiting example of a software architecture, and it will be appreciated that many other architectures can be implemented to facilitate the functionality described herein. In various embodiments, the software 1302 is implemented by hardware such as a machine 1400 of FIG. 14 that includes processors 1410, memory 1430, and input/output (I/O) components 1450. In this example architecture, the software 1302 can be conceptualized as a stack of layers where each layer may provide a particular functionality. For example, the software 1302 includes layers such as an operating system 1304, libraries 1306, frameworks 1308, and applications 1310. Operationally, the applications 1310 invoke API calls 1312 through the software stack and receive messages 1314 in response to the API calls 1312, consistent with some embodiments.

In various implementations, the operating system 1304 manages hardware resources and provides common services. The operating system 1304 includes, for example, a kernel 1320, services 1322, and drivers 1324. The kernel 1320 acts as an abstraction layer between the hardware and the other software layers, consistent with some embodiments. For example, the kernel 1320 provides memory management, processor management (e.g., scheduling), component management, networking, and security settings, among other functionality. The services 1322 can provide other common services for the other software layers. The drivers 1324 are responsible for controlling or interfacing with the underlying hardware, according to some embodiments. For instance, the drivers 1324 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 1306 provide a low-level common infrastructure utilized by the applications 1310. The libraries 1306 can include system libraries 1330 (e.g., C standard library) that can provide functions such as memory allocation functions, string manipulation functions, mathematic functions, and the like. In addition, the libraries 1306 can include API libraries 1332 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1306 can also include a wide variety of other libraries 1334 to provide many other APIs to the applications 1310.

The frameworks 1308 provide a high-level common infrastructure that can be utilized by the applications 1310, according to some embodiments. For example, the frameworks 1308 provide various graphic user interface (GUI) functions, high-level resource management, high-level location services, and so forth. The frameworks 1308 can provide a broad spectrum of other APIs that can be utilized by the applications 1310, some of which may be specific to a particular operating system or platform.

In an example embodiment, the applications 1310 include a home application 1350, a contacts application 1352, a browser application 1354, a book reader application 1356, a location application 1358, a media application 1360, a messaging application 1362, a game application 1364, and a broad assortment of other applications such as a third-party application 1366. According to some embodiments, the applications 1310 are programs that execute functions defined in the programs. Various programming languages can be employed to create one or more of the applications 1310, structured in a variety of manners, such as object-oriented programming languages (e.g., Objective-C, Java, or C++) or procedural programming languages (e.g., C or assembly language). In a specific example, the third-party application 1366 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1366 can invoke the API calls 1312 provided by the operating system 1304 to facilitate functionality described herein.

Figure 14:
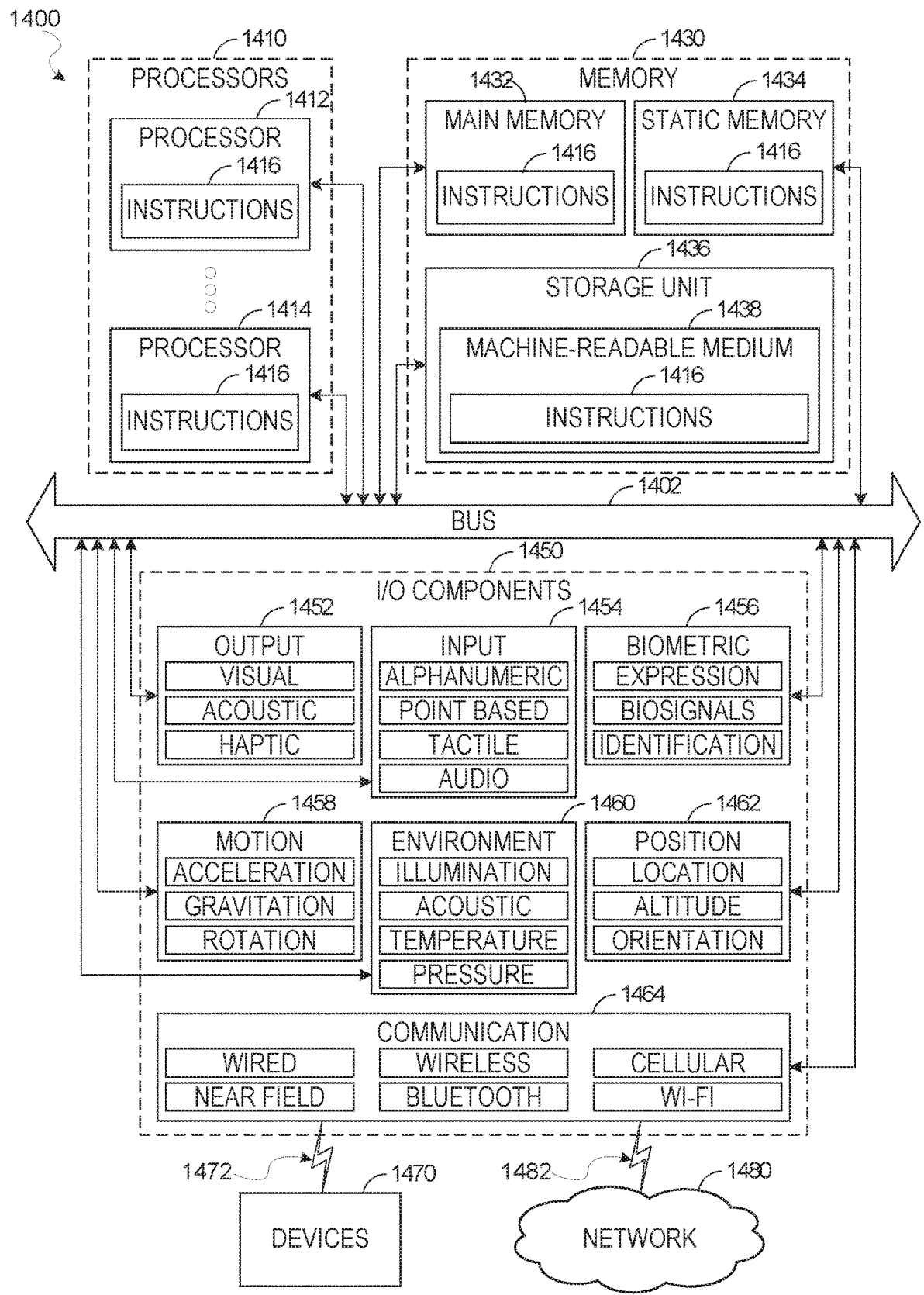
FIG. 14 shows a machine as an example computer system with instructions to cause the machine to implement the user message system, according to some example embodiments.

FIG. 14 illustrates a diagrammatic representation of a machine 1400 in the form of a computer system within which a set of instructions may be executed for causing the machine to perform any one or more of the methodologies discussed herein, according to an example embodiment. Specifically. FIG. 14 shows a diagrammatic representation of the machine 1400 in the example form of a computer system, within which instructions 1416 (e.g., software, a program, an application, an applet, an app, or other executable code) for causing the machine 1400 to perform any one or more of the methodologies discussed herein may be executed. The instructions 1416 transform the general, non-programmed machine 1400 into a particular machine 1400 programmed to carry out the described and illustrated functions in the manner described. In alternative embodiments, the machine 1400 operates as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a PC), a tablet computer, a laptop computer, a netbook, a STB, a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1416, sequentially or otherwise, that specify actions to be taken by the machine 1400. Further, while only a single machine 1400 is illustrated, the term "machine" shall also be taken to include a collection of machines 1400 that individually or jointly execute the instructions 1416 to perform any one or more of the methodologies discussed herein.

The machine 1400 may include processors 1410, memory 1430, and I/O components 1450, which may be configured to communicate with each other such as via a bus 1402. In an example embodiment, the processors 1410 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1412 and a processor 1414 that may execute the instructions 1416. The term "processor" is intended to include multi-core processors that may comprise two or more independent processors (sometimes referred to as "cores") that may execute instructions contemporaneously. Although FIG. 14 shows multiple processors 1410, the machine 1400 may include a single processor with a single core, a single processor with multiple cores (e.g., a multi-core processor), multiple processors with a single core, multiple processors with multiples cores, or any combination thereof.

The memory 1430 may include a main memory 1432, a static memory 1434, and a storage unit 1436, all accessible to the processors 1410 such as via the bus 1402. The main memory 1430, the static memory 1434, and storage unit 1436 store the instructions 1416 embodying any one or more of the methodologies or functions described herein. The instructions 1416 may also reside, completely or partially, within the main memory 1432, within the static memory 1434, within the storage unit 1436, within at least one of the processors 1410 (e.g., within the processor's cache memory), or any suitable combination thereof, during execution thereof by the machine 1400.

The I/O components 1450 may include a wide variety of components to receive input, provide output, produce output, transmit information, exchange information, capture measurements, and so on. The specific I/O components 1450 that are included in a particular machine will depend on the type of machine. For example, portable machines such as mobile phones will likely include a touch input device or other such input mechanisms, while a headless server machine will likely not include such a touch input device. It will be appreciated that the I/O components 1450 may include many other components that are not shown in FIG. 14. The I/O components 1450 are grouped according to functionality merely for simplifying the following discussion and the grouping is in no way limiting. In various example embodiments, the I/O components 1450 may include output components 1452 and input components 1454. The output components 1452 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1454 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1450 may include biometric components 1456, motion components 1458, environmental components 1460, or position components 1462, among a wide array of other components. For example, the biometric components 1456 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1458 may include acceleration sensor components (e.g., accelerometer), gravitation sensor components, rotation sensor components (e.g., gyroscope), and so forth. The environmental components 1460 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1462 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1450 may include communication components 1464 operable to couple the machine 1400 to a network 1480 or devices 1470 via a coupling 1482 and a coupling 1472, respectively. For example, the communication components 1464 may include a network interface component or another suitable device to interface with the network 1480. In further examples, the communication components 1464 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1470 may be another machine or any of a wide variety of peripheral devices (e.g., a peripheral device coupled via a USB).

Moreover, the communication components 1464 may detect identifiers or include components operable to detect identifiers. For example, the communication components 1464 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1464, such as location via Internet Protocol (IP) geolocation, location via Wi-Fi® signal triangulation, location via detecting an NFC beacon signal that may indicate a particular location, and so forth.

The various memories (i.e., 1430, 1432, 1434, and/or memory of the processor(s) 1410) and/or storage unit 1436 may store one or more sets of instructions and data structures (e.g., software) embodying or utilized by any one or more of the methodologies or functions described herein. These instructions (e.g., the instructions 1416), when executed by processor(s) 1410, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1480 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1480 or a portion of the network 1480 may include a wireless or cellular network, and the coupling 1482 may be a Code Division Multiple Access (CDMA) connection, a Global System for Mobile communications (GSM) connection, or another type of cellular or wireless coupling. In this example, the coupling 1482 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX). Long Term Evolution (LTE) standard, others defined by various standard-setting organizations, other long range protocols, or other data transfer technology.

The instructions 1416 may be transmitted or received over the network 1480 using a transmission medium via a network interface device (e.g., a network interface component included in the communication components 1464) and utilizing any one of a number of well-known transfer protocols (e.g., hypertext transfer protocol (HTTP)). Similarly, the instructions 1416 may be transmitted or received using a transmission medium via the coupling 1472 (e.g., a peer-to-peer coupling) to the devices 1470. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1416 for execution by the machine 1400, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A method comprising:
identifying, using one or more processors of a machine, a plurality of users of a network site;
generating, using a machine learning scheme of the network site, values of a first user interaction type for the plurality of users, each of the values of the first user interaction type indicating a likelihood that a given user of the plurality of users interacts with an electronic document of the network site;
partitioning the values of the first user interaction type into ranges;
live network testing, on the network site, a sample of users from each of the ranges to identify one or more top ranges that comprise users that perform an elevated amount of a second user interaction type with the network site, the second user interaction type being a different user interaction with the network site than the first user interaction type;
storing one or more users that are in the one or more top ranges based on the one or more users having first interaction type values, generated by the machine learning scheme, that are in the one or more top ranges; and transmitting, by the network site, an electronic document to the one or more users.

2. The method of claim 1, wherein identifying the plurality of users comprises:
determining that the plurality of users correspond to a preconfigured network site event.

3. The method of claim 2, wherein the preconfigured network site event is abandonment of a network site navigation path.

4. The method of claim 3, wherein the network site navigation path is a network site transaction.

5. The method of claim 1, wherein the first user interaction type is an open electronic document interaction.

6. The method of claim 1, further comprising:
training the machine learning scheme using training data comprising historical network site document data.

7. The method of claim 6, wherein the historical network site document data comprises attribute values describing attributes of previous electronic documents of the network site.

8. The method of claim 1, wherein the machine learning scheme is a decision tree classifier machine learning scheme.

9. The method of claim 1, wherein the values of the first user interaction type are partitioned into ranges using a grouping machine learning scheme.

10. The method of claim 1, wherein the values of the first user interaction type are partitioned into ranges using a set of pre-configured ranges.

11. The method, of claim 1, further comprising:
generating, using a first ranking machine learning scheme, an unpopulated content scheme ranking data set that ranks a plurality of unpopulated content schemes;
generating, for each of the plurality of users, a plurality of populated content schemes by populating the plurality of unpopulated content schemes with network site content items that match user profile data of each user;
generating, using a second ranking machine learning scheme, a populated content scheme ranking data set that ranks the plurality of populated content schemes, the second ranking machine learning scheme receiving input data that includes output of the first ranking machine learning scheme that is trained to rank unpopulated content schemes; and
generating, for each of the plurality of users, the electronic document using one or more top ranked populated content schemes.

12. The method of claim 11, wherein the unpopulated content schemes are network item retrieval schemes that order network site items in a user interface window.

13. The method of claim 11, wherein the unpopulated content schemes are populated by selecting network items according to each content scheme.

14. A system comprising:
one or more processors of a machine; and
a memory storing instructions that, when executed by the one or more processors, cause the machine to perform operations comprising:
identifying, using the one or more processors of the machine, a plurality of users of a network site;
generating, using a machine learning scheme of the network site, values of a first user interaction type for the plurality of users, each of the values of the first user interaction type indicating a likelihood that a given user of the plurality of users interacts with an electronic document of the network site;
partitioning the values of the first user interaction type into ranges;

live network testing, on the network site, a sample of users from each of the ranges to identify one or more top ranges that comprise users that perform an elevated amount of a second user interaction type with the network site, the second user interaction type being a different user interaction with the network site than the first user interaction type;

storing one or more users that are in the one or more top ranges based on the one or more users having first interaction type values, generated by the machine learning scheme, that are in the one or more top ranges; and transmitting, by the network site, an electronic document to the one or more users.

15. The system of claim 14, wherein identifying the plurality of users comprises: determining that the plurality of users correspond to a preconfigured network site event.

16. The system of claim 15, wherein the preconfigured network site event is abandonment of a network site navigation path.

17. The system of claim 16, wherein the network site navigation path is a network site transaction.

18. The system of claim 14, wherein the first user interaction type is an open electronic document interaction.

19. A machine-readable storage device embodying instructions that, when executed by a machine, cause the machine to perform operations comprising:

identifying, using one or more processors of a machine, a plurality of users of a network site;

generating, using a machine learning scheme of the network site, values of a first user interaction type for the plurality of users, each of the values of the first user interaction type indicating a likelihood that a given user of the plurality of users interacts with an electronic document of the network site;

partitioning the values of the first user interaction type into ranges;

live network testing, on the network site, a sample of users from each of the ranges to identify one or more top ranges that comprise users that perform an elevated amount of a second user interaction type with the network site, the second user interaction type being a different user interaction with the network site than the first user interaction type;

storing one or more users that are in the one or more top ranges based on the one or more users having first interaction type values, generated by the machine learning scheme, that are in the one or more top ranges; and transmitting, by the network site, an electronic document to the one or more users.

20. The machine-readable storage device of claim 19, wherein identifying the plurality of users comprises: determining that the plurality of users correspond to a preconfigured network site event.

* * * * *